(12) United States Patent
Geyer et al.

(10) Patent No.: US 12,046,082 B2
(45) Date of Patent: Jul. 23, 2024

(54) METHOD FOR PROCESSING SURROUNDINGS INFORMATION OF A MOTOR VEHICLE, COMPUTER PROGRAM PRODUCT AND ELECTRONIC INFORMATION PROCESSING SYSTEM

(71) Applicant: AUDI AG, Ingolstadt (DE)

(72) Inventors: Jakob Geyer, Greding (DE); Manuel Guttenberger, Amberg (DE)

(73) Assignee: AUDI AG, Ingolstadt (DE)

( * ) Notice: Subject to any disclaimer, the term of this patent is extended or adjusted under 35 U.S.C. 154(b) by 579 days.

(21) Appl. No.: 17/274,663

(22) PCT Filed: Nov. 11, 2019

(86) PCT No.: PCT/EP2019/080793
§ 371 (c)(1),
(2) Date: Mar. 9, 2021

(87) PCT Pub. No.: WO2020/114716
PCT Pub. Date: Jun. 11, 2020

(65) Prior Publication Data
US 2021/0256780 A1    Aug. 19, 2021

(30) Foreign Application Priority Data
Dec. 6, 2018  (DE) ..................... 10 2018 221 093.4

(51) Int. Cl.
*G07C 5/00*   (2006.01)
*G01C 21/00*  (2006.01)
(Continued)

(52) U.S. Cl.
CPC ......... *G07C 5/008* (2013.01); *G01C 21/3889* (2020.08); *G06K 19/06037* (2013.01); *G07C 5/085* (2013.01); *G08G 1/017* (2013.01)

(58) Field of Classification Search
CPC ...... G07C 5/008; G07C 5/085; G07C 5/0866; G01C 21/3889; G06K 19/06037; G08G 1/017
See application file for complete search history.

(56) References Cited

U.S. PATENT DOCUMENTS 9,436,180 B1 *  9/2016  Fredinburg ............. G06F 21/00
10,049,566 B2   8/2018  Shanahan
(Continued)

FOREIGN PATENT DOCUMENTS

CN       102037490 A    4/2011
CN       105574467 A    5/2016
(Continued)

OTHER PUBLICATIONS

International Preliminary Report on Patentability directed to related International Patent Application No. PCT/EP2019/080793, completed Nov. 5, 2020, with attached English-language translation; 16 pages.
(Continued)

*Primary Examiner* — Nga X Nguyen
(74) *Attorney, Agent, or Firm* — Sterne, Kessler, Goldstein & Fox P.L.L.C.

(57) ABSTRACT

The present disclosure relates to a method for electronically processing surroundings information of a motor vehicle, in which the surroundings information is detected by at least one detection unit of the motor vehicle. Personal information included in the surroundings information is anonymized and/or deleted, depending upon whether the person to whom the personal information relates has made an electronic request. Personal information in the surroundings information can be extrapolated by an identifier of the motor vehicle and/or location information. The present disclosure also
(Continued)

relates to a computer program product and an electronic information processing system.

12 Claims, 1 Drawing Sheet

(51) Int. Cl.
*G06K 19/06* (2006.01)
*G07C 5/08* (2006.01)
*G08G 1/017* (2006.01)

(56) References Cited

U.S. PATENT DOCUMENTS

| | | | |
|---|---|---|---|
| 2004/0083030 A1* | 4/2004 | Sumida | G07C 5/008 |
| | | | 701/1 |
| 2008/0180459 A1 | 7/2008 | Jung et al. | |
| 2009/0015684 A1 | 1/2009 | Ooga et al. | |
| 2011/0123068 A1 | 5/2011 | Miksa et al. | |
| 2012/0130627 A1* | 5/2012 | Islam | G06Q 10/08 |
| | | | 701/300 |
| 2016/0104035 A1 | 4/2016 | Wang et al. | |
| 2017/0084065 A1 | 3/2017 | Gordon et al. | |
| 2017/0220816 A1 | 8/2017 | Matusek et al. | |
| 2020/0148105 A1* | 5/2020 | Hiraiwa | B60Q 9/008 |
| 2020/0257821 A1 | 8/2020 | Lai | |

FOREIGN PATENT DOCUMENTS

| | | |
|---|---|---|
| CN | 107566743 A | 1/2018 |
| DE | 102015217492 A1 | 3/2017 |

OTHER PUBLICATIONS

International Search Report and Written Opinion of the International Searching Authority directed to related International Patent Application No. PCT/EP2019/080793, mailed Feb. 7, 2020, with attached English-language translation; 18 pages.

Written Opinion of the International Searching Authority directed to related International Patent Application No. PCT/EP2019/080793, mailed Jun. 17, 2020, with attached English-language translation; 8 pages.

Written Opinion of the International Searching Authority directed to related International Patent Application No. PCT/EP2019/080793, mailed Oct. 1, 2020, with attached English-language translation; 13 pages.

* cited by examiner

METHOD FOR PROCESSING SURROUNDINGS INFORMATION OF A MOTOR VEHICLE, COMPUTER PROGRAM PRODUCT AND ELECTRONIC INFORMATION PROCESSING SYSTEM

TECHNICAL FIELD

One aspect of the present disclosure relates to a method for electronically processing surroundings information of a motor vehicle. The surroundings information is detected by at least one detection unit of the motor vehicle. Personal information that is contained in the surroundings information is anonymized and/or deleted depending on whether the person to whom the personal information are related has submitted an electronic request. Another aspect of the present disclosure relates to a computer program product. In addition, one aspect of the present disclosure relates to an electronic information processing system.

BACKGROUND

A device and a method for creating or updating a surroundings map of a motor vehicle are known from DE 10 2015 217 492 A1. An image processing device is designed in such a way that personal data contained in the detected images are recognized and the personal characteristics are analyzed in the detected images. This analysis takes place independently of the person who was actually recognized. An analysis or deletion takes place in a general way that if a person is recognized as an object in the image and differs in this respect from other types of objects, an anonymization and/or deletion takes place. There is no provision to recognize which person is actually involved. Only when the anonymization and/or deletion is carried out, the image is saved in a storage device.

A disadvantage of this approach is that a great deal of effort has to be made in order to always and fundamentally recognize in the respective images whether there are people located in them, who then all have to be completely deleted or anonymized.

In addition, US 2008/0180459 A1 discloses that personal information in an image can be anonymized by an anonymization unit. A general anonymization is also carried out there. However, it can be provided that a specific person identifies himself in the corresponding system. With regard to anonymization, it can be provided that a plurality of anonymization strategies are offered and one of these anonymization strategies is selected by a person. In this embodiment, too, a relatively general anonymization or deletion is provided, which is very costly.

In addition, U.S. Pat. No. 9,436,180 B1 discloses a vehicle which is explicitly designed to detect surroundings information, this surroundings information then being used for other purposes. For example, these can be made available for the general public accessibility of maps or the like. With this prior art, it is possible for users to be able to provide information that unambiguously identifies the user to a central unit, in particular also provide specific options, in order to be able to protect privacy. This means that this information is then transmitted to the recording vehicle and then, when the vehicle is in this local region or will move there in the future, anonymization or deletion takes place when this local private region is detected by the vehicle's detection unit. In this refinement, therefore, prior to the detection of the surroundings, preventive anonymization information is stored by a specific person, which is then made available to the vehicle when the vehicle starts a detection trip. This also requires a relatively complex procedure since the vehicle may have to take into consideration a plurality of such specific and stored private regions during the detection trip.

Since the data protection regulations have to be taken into consideration, it is also of great importance when the surroundings are detected with the detection units of a vehicle. This comes to the fore particularly when the information detected should or must be stored over a longer period of time and/or the data detected should be used for other purposes.

BRIEF DESCRIPTION OF THE DRAWINGS/FIGURES

DETAILED DESCRIPTION

Figure 1:
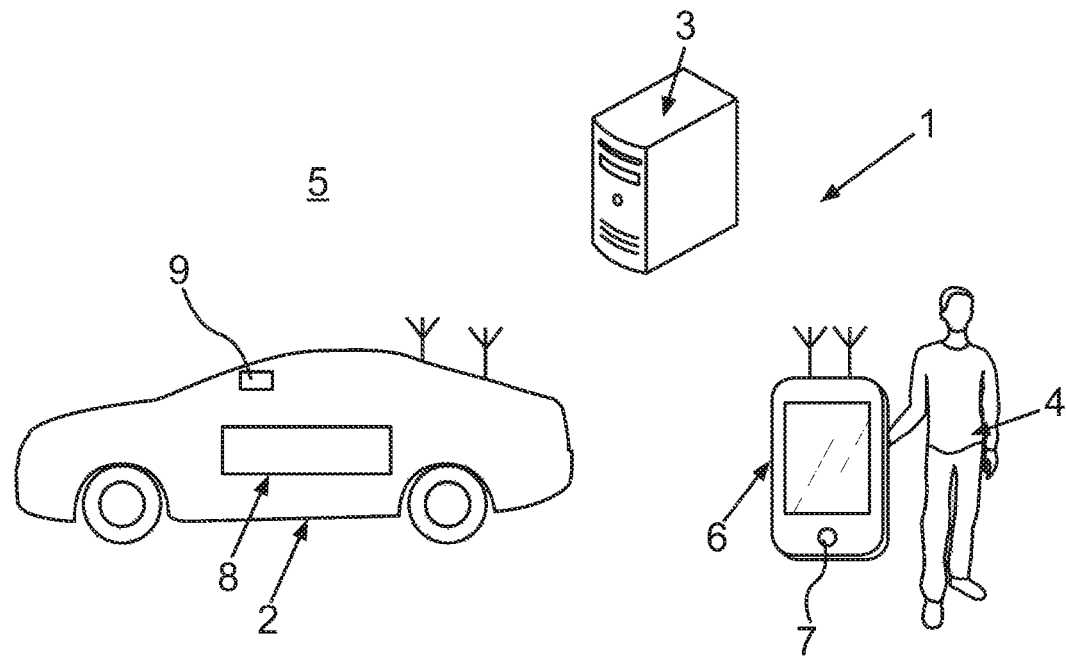
FIG. 1 is a schematic representation of an embodiment of an electronic information processing system, in accordance with some aspects.

It is the object of the present disclosure to create a method for the electronic processing of surroundings information of a motor vehicle, in which the processing can be carried out relatively easily, yet the data protection requirements can be met.

This object is achieved by a method, a computer program product, and an electronic information processing system according to the features of the independent claims.

One aspect of the present disclosure relates to a method for electronically processing surroundings information of a motor vehicle. The surroundings information is detected by at least one detection unit of the motor vehicle. Personal information that is contained in the surroundings information is anonymized and/or deleted depending on whether the person to whom the personal information are related has submitted an electronic request. The motor vehicle is provided with a perceivable identifier with which the motor vehicle is characterized as the motor vehicle detected by the detection unit as the surroundings. The person can use a communication unit with this identifier to contact an electronic evaluation unit to determine whether personal information relating to his person is contained in the surroundings information. By way of a non-limiting example, it can be provided that the personspecifying person-location information is transmitted from the person to an electronic evaluation unit via a communication unit. This personal location information is compared with motor vehicle location information that was detected during a trip of the motor vehicle to detect surroundings information. If the personal location information matches the motor vehicle location information, the person is automatically at least informed via an electronic message from the evaluation unit. In particular, to the effect that personal information about this person can be detected.

In some aspects, the method disclosed herein makes it possible that information about a specific person does not have to be available before the trip, which person is to be anonymized and/or deleted in surroundings information, but that surroundings information can initially be recorded unhindered by the detection unit, even if in this case personal Information is also detected. The proposed method therefore reduces the effort involved in detecting the surroundings information. Since surroundings information may then have been detected with personal information, the described, individually possible processes can subsequently give a person the option of first of all being able to find out whether the information about this person contains specific personal information. In this context, in a first method step, information is then only provided about the evaluation unit, which a person can request and in which he or she learns about options as to whether personal information was recorded at all and, in this case, what options are then available to be able to act accordingly. This method sequence allows the person, after the detection of surroundings information, possibly also including personal information, after receiving the primary information about the evaluation unit, to determine how this will be dealt with when personal information has been recorded. In particular, after receiving the information from the evaluation unit, the person can then decide whether anonymization and/or deletion is desired. The proposed method makes it possible, through very specific procedures, to offer the person, after the detection of surroundings information, the option of being able to obtain information about the detected surroundings information. Accordingly, a person who is located in the surroundings can then very easily inform that they themselves perceive the motor vehicle with the identifier that is perceivable to the person and, based on this specific identifier, recognize that a very specific motor vehicle is moving in this case or is in the vicinity of the person and this is identified by the identifier in such a way that surroundings information is recorded in a very targeted manner. If a person recognizes such a motor vehicle with a perceivable identifier, the person can extrapolate that surroundings information is being detected and, if necessary, that personal information relating to this person is or has been recorded.

In some aspects, a person can therefore also easily recognize that possibly personal information has been recorded and can then use this identifier to make primary contact with the electronic evaluation unit using the described specific procedure. A very efficient multi-stage method is created through this very specific way described, namely the chain of effects via the perception of the identifier, the pickup of the identifier to establish contact with the electronic evaluation unit, and then in turn to receive primary information, via this electronic evaluation unit, about how to proceed, if necessary, in particular with regard to the option of finding out whether personal information is available and, in this case, whether it should be anonymized and/or deleted. This is because, if necessary, a great deal of effort to search through the surroundings information and then specifically anonymize and/or delete the personal information is pushed to the end of the processing chain of surroundings information. In particular, if a person is not bothered by the fact that personal information has been recorded in the surroundings information, this final step of anonymization and/or deletion can then be omitted, which can be decided by the person in question. In particular, this can also avoid expenditure in processing surroundings information and in particular in taking data protection into consideration. As also indicated by the further option, additionally or instead of the fact that the person himself perceives via the specific identifier that he can be in the detection range of a detection unit of the specific motor vehicle, on the other hand, it can also be determined via the location information mentioned, whether a person was at a specific location at a specific point in time and whether the motor vehicle was then also at this location at this point in time. From this, too, it can then be extrapolated that personal information may be contained in the detected surroundings information. In this second option, this comparison process of the location information is advantageously carried out automatically and the person is then automatically informed by an electronic message. In particular, this only takes place if personal information was actually found in the surroundings information during this comparison. In this case, too, the message from the evaluation unit that is sent to the person can initially contain general information that provides information that specific courses of action are offered for the person. By way of a non-limiting example, when the person responds as a result of this message, in particular through electronic contact with the electronic evaluation unit, can further courses of action be offered and carried out, in particular if the person then also wishes or enables these options. In particular, this can then also be anonymization or deletion.

In some aspects, the method disclosed herein offers very specific options for, in principle, drawing a person's attention or for giving himself the opportunity to find out whether personal information is or could be contained in detected surroundings information. With the proposed multi-stage method, anonymization and/or deletion is actually only performed at the end of the sequencer, if this is explicitly desired and requested by a person following a detection method. Among other things, this saves a considerable amount of time and effort involved in processing the surroundings information.

In some aspects, the perceivable identifier of the motor vehicle is generated as an optical identifier and is perceptibly displayed on the vehicle. For example, the identifier can be generated on an outside of the motor vehicle so that it can be perceived easily and safely in the surroundings, in particular by a person in the surroundings. In particular, it is then also possible to be able to detect this identifier with an electronic device, for example an electronic detection unit. For example, it is then possible in this context for a person to be able to record this identifier with a communication terminal that also has a camera, in particular as an image. For example, this perceivable identifier can be an internet link or a link to a software application or else a QR (Quick Response) code. These examples are easy to understand and easy to record, so that a simple and quick option of being able to come into contact with the electronic evaluation unit is also created in this case.

In some aspects, it is provided that after the person initiated contact with the electronic evaluation unit or via the message transmitted automatically to the person from the electronic evaluation unit first, information about further courses of action for the person is offered via this electronic evaluation unit.

In some aspects, it is provided that a verification request or an information request is offered to the person as a course of action, with which the person can verify whether personal information has been detected. By way of a non-limiting example, an anonymization request can be offered as a course of action, with which the person can anonymize the personal information detected. Further, a deletion request can also be offered as a possible course of action, with which the detected personal information is deleted. There are thus specific, different courses of action which bring the advantages already mentioned above.

In some aspects, it is provided that the identifier is dynamically changed in a defined manner as the motor vehicle moves forward, so that a connection is generated between a point in time at which the motor vehicle is located at a specific location and the point in time at which the identifier has a time-specific identifier appearance due to dynamic change. Depending on this context, it is recognized that a person was located at the location of the motor vehicle at this point in time when the person with this specific identifier appearance of the identifier establishes communication with the electronic evaluation unit. In particular, it can also be extrapolated that personal information about this person has been detected. In this context, a relatively unambiguous context can be offered, because only if the person is located in the immediate surroundings of the motor vehicle at the point in time at which the specific identification phenomenon occurred or was displayed on the motor vehicle, is this time-limited display of the identifier appearance that corresponding indication.

If the person can perceive the identifier directly, namely with their own eyes, and there is thus also the option of detecting this identifier electronically at the time, namely with a separate detection unit, this confirms that this person must have been at the corresponding location at this point in time. In this case, the perception can also take place in that the identifier is recorded as an image with the detection unit from the perspective of the person and is used as an identification. The identifier and/or also the bypassing of the vehicle which has the identifier can then be used by image evaluation in order to carry out a location identification at this specific point in time.

In some aspects, it is provided that at least one piece of personal identification information is transmitted from the person to the electronic evaluation unit and made available, and a recognition method for recognizing the person is trained with this personal information. The transmission of personal identification information to the evaluation unit takes place in particular after detecting the surroundings information, in particular also after the person has become aware of the motor vehicle which is detecting, in particular the identifier thereof, and/or through the electronic message received from the evaluation unit. The detected surroundings information is examined with the trained or parameterized recognition method to determine whether the person was detected. The search result is communicated to the person by transmitting a message. In particular, transmitting a message takes place electronically, i.e., an electronic message is transmitted from the electronic evaluation unit to a communication device of the person.

In some aspects, if the person is identified by this communication device, for example, this can be done by an unambiguous identifier of the communication terminal, which is then assigned to the person. The person can register or identify himself with the electronic evaluation unit by means of this communication device, which can in particular be a communication terminal device. As a result, among other things, a transmission of an electronic message can also take place quickly and easily from the electronic evaluation unit to this communication device.

In some aspects, the surroundings information is preferably detected during a training trip of the motor vehicle, during which training information is recorded by the detection unit. This training information is evaluated for accuracy after the training trip. This means that a training trip should be understood to mean, in particular, that the functionality of the detection unit is observed and evaluated with the motor vehicle. The information detected by the detection unit during this training trip, in particular also the surroundings information, is preferably evaluated after the training trip in order to be able to carry out an analysis of how precisely and functionally the detection unit is working. The method described above is particularly advantageous in such scenarios, since extensive use of the data contained, namely the surroundings information, takes place precisely in such training trips, in particular, this information is also stored over a longer period of time and a multiple extensive use of this surroundings information is required and necessary. Particular attention must also be paid to data protection, precisely because it is preferably provided that information of this kind from a training trip is also stored for a longer period in order to be able to carry out further analysis of this information at a later point in time.

In some aspects, the surroundings information is detected using at least one camera as the detection unit. Personal information is particularly critical when images or videos are recorded with the camera. This information can be easily and quickly recognized and perceived in the images, so that data protection is of particular importance in this case.

In some aspects, personal information can be specific body information, in particular body parts. For example, it can be the face or the entire person. In addition to or instead of this, personal data can also be the name or the place of residence or the like. In addition to this data, referred to as direct personal information, personal data can also be indirect personal information. This can be, for example, a license plate of a vehicle, via which the proprietor, etc. can be extrapolated indirectly.

In some aspects, the detected surroundings information is stored in a storage unit. This takes place in particular before any anonymization and/or deletion of personal information that may be requested.

In some aspects, the method described herein creates an option both on the part of the motor vehicle and thus of the system performing the detection, to automatically inform a person about the possibility of being detected, and on the other hand, in that an option is passively created which is recognizable for the person, regardless of whether an electronic evaluation unit makes contact with the person, for the person himself to make contact with the electronic evaluation unit, a comprehensive method is provided in particular in order to optionally establish contact between both parties in question, namely the person making the detection on the one hand, and a person affected by the detection on the other hand, to coordinate what should be done with any personal information that may be available. As a result, a bidirectional option of establishing contact is created, so to speak, in order to take into consideration the requirements of data protection in such complex situations as occurs when the surroundings of a motor vehicle are recorded.

This not only provides a given, single, general approach, but also allows for a dynamic and diverse decision-making scenario which, after a recording scenario has taken place, ultimately leaves the person with the option as to whether or not they are interested in anonymizing and/or deleting any personal information. With the option already described above of which personal information is made available to the evaluation unit by the person, the accuracy of the analysis can also be improved. In order to generally be able to provide increased certainty about the statement of personal information, the person himself can transmit personal identification information to the electronic evaluation unit. In principle, this can also only take place when the person has established contact with the electronic evaluation unit himself via the perceivable identifier or when he has received a corresponding electronic message from the electronic evaluation unit as the primary contacting. In an advantageous embodiment, the transfer of the personal identification information to this evaluation unit allows an even better analysis method to be carried out to determine whether personal information about the person in question is actually contained in the surroundings information. In this way, more precise and complete information can be offered to the person and a decision-making process as to whether anonymization and/or deletion is necessary or should be carried out can be specified. For example, the requesting person can then provide a specific amount of data about himself in this context, which means that recognition can be ensured with the highest possible probability. For example, specific personal features such as facial features or relating to the entire body of the person can be transmitted for this purpose. It is also possible for different information from a body feature, for example the face, for example different perspectives of the face, to be transmitted to the electronic evaluation unit as personal identification information. Other identification information, such as clothing or the like, can also be transmitted. Specific color combinations of this clothing can also be transmitted as personal identification information from the person to the electronic evaluation unit.

In some aspects, by means of this provided data of the person, as already explained above, a recognition method is trained or parameterized and the detected surroundings information is examined accordingly. In particular, it is then provided that, as a final step, the data then transferred by the person will also be subsequently deleted. In particular, it can then also be agreed that a specific time interval, which can be a plurality of weeks and possibly up to a month, may be used as processing time for the provision of the information. This can also be made possible, for example, in the form of a scalable and distributed system that processes incoming requests with appropriate prioritization.

In some aspects, a computer program product including instructions which, when the program is executed by a computer, cause the computer to execute the method according to the above-mentioned aspect or an advantageous embodiment thereof.

A further aspect relates to a computer-readable medium comprising instructions which, when executed by a computer, cause the computer to execute the method according to the above-mentioned aspect or an advantageous embodiment thereof. In particular, a computer-readable data carrier is therefore also provided on which the above-mentioned computer program product is stored.

Another aspect of the present disclosure relates to an electronic information processing system having a motor vehicle and an evaluation unit, the information processing system being designed to carry out a method according to the above-mentioned aspect or an advantageous embodiment thereof. In particular, this method is carried out by the electronic information processing system.

The motor vehicle is preferably designed as a motor vehicle, in particular as a passenger vehicle or truck, or as a passenger bus or motorcycle.

The present disclosure also includes the combinations of the features of the described embodiments.

Embodiments presented in this disclosure are described below by way of example.

The embodiments explained in the following are preferred embodiments. In the embodiments, the described components of the embodiments each represent individual features, which are to be considered to be independent of one another. Furthermore, the described embodiments may also be supplemented by further features as already described. In the drawings, the same reference signs refer to functionally identical elements.

FIG. 1 is a schematic representation of an embodiment of an electronic information processing system, in accordance with some aspects. In FIG. 1, an electronic information processing system 1 is shown in a schematic representation. This information processing system 1 has at least one motor vehicle 2. The motor vehicle 2 is a passenger vehicle in this case. In addition, the information processing system 1 has an electronic evaluation unit 3. The electronic evaluation unit 3 can be a server, for example.

In particular, it is provided that a person 4 is located in the surroundings 5. The person 4 can carry a portable electronic communication device 6. This communication device 6 can be a communication terminal device, such as a mobile radio device. In particular, this communication device 6 also has an optical detection unit 7, in particular a camera.

In particular, it is provided that the motor vehicle 2 has a defined identifier 8. The identifier 8 is in particular an optical identifier. However, it can also be an acoustic identifier, for example. The optical identifier 8 is preferably arranged on an outside of the motor vehicle 2 or is arranged so that it can be visually perceived from outside the motor vehicle 2, in particular can be perceived visually by the person 4 when the motor vehicle 2 is located in the surroundings of the person 4. This identifier 8 can be detected, for example detected by the detection unit 7. The optical identifier 8 can be a static identifier which is arranged in a stationary manner on the motor vehicle 2 and which cannot be changed. For example, this can be glued or printed. The optical identifier 8 can, however, also be an electronic identifier. In this embodiment, in particular, it can be dynamically changeable so that it has different time-specific identifier appearances defined at different points in time.

It is provided that the motor vehicle 2 is designed to carry out training trips. The motor vehicle 2 has at least one detection unit 9. This detection unit 9 is arranged in such a way that it can detect the surroundings 5 of the motor vehicle 2. In particular, the detection unit 9 is an optical detection unit such as a camera. An infrared camera can also be provided. However, a lidar system can also be provided. Other sensors can also be provided. With this detection unit 9, the detecting of surroundings information can thus take place. Particularly during a training trip, it is provided that, for the assessment of the functionality of the detection unit 9, surroundings information is recorded and stored so that it can be analyzed afterwards. The functionality of the detection unit 9 can then be assessed as a function of this analysis. In particular, it is then also provided in this context that the surroundings information recorded during this training trip is stored for a longer period of time in order to be able to use it, if necessary, for a plurality of analyses.

In such scenarios, but not only in such, it can then be the case that personal information, in particular of the person 4, is also detected. In order to meet the requirements of data protection in particular, specific electronic processing of this surroundings information is carried out.

Figure 2:
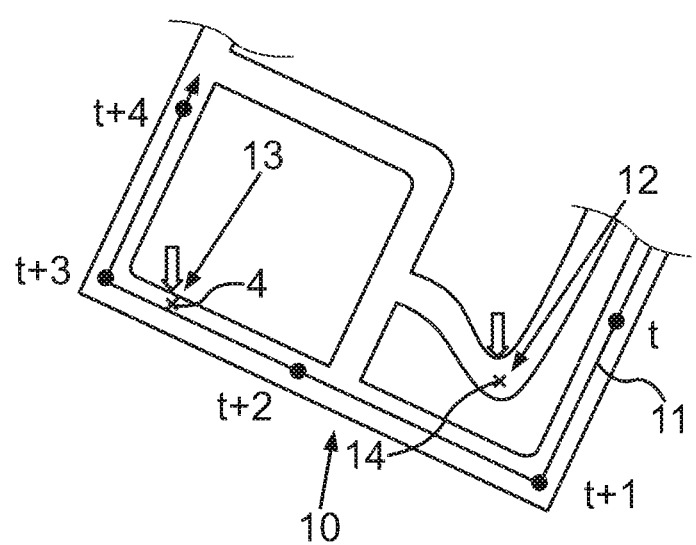
FIG. 2 is a schematic representation of the surroundings in which the motor vehicle moves along a trajectory and detects surroundings information, in accordance with some aspects.

FIG. 2 is a schematic representation of the surroundings in which the motor vehicle moves along a trajectory and detects surroundings information, in accordance with some aspects. In FIG. 2, a plan view of a traffic route network 10 is shown in a very simplified schematic representation. In this traffic route network 10, the vehicle 2 moves along a travel trajectory 11. During this trip, surroundings information is detected with the at least one detection unit 9. A person 14 on the one hand and a person 4 on the other hand are located by way of example at the various positions 12 and 13 shown in FIG. 2. As can be seen in the representation in FIG. 2, the person 14 is located at a greater distance from the motor vehicle 2 and not in the detection range of the detection unit 9 when the motor vehicle 2 moves along the travel trajectory at the point in time t and the point in time t+1. The person 14 is therefore not detected by the detection unit 9 and the surroundings information that is recorded at point in time t and at the point in time t+1 as well as at the points in time in between does not contain any personal information about the person 14. If the motor vehicle 2 now moves further and comes close to the person 4 at the point in time t+2, the example provides that the detection unit 9 detects surroundings information and personal information of the person 4. In this regard, the motor vehicle 2 continues driving during the trip, in particular the training trip, and drives past the person 4. In particular, it continues its trip and reaches specific regions of the traffic route network 10 at the exemplary points in time t+3 and t+4.

Accordingly, it is now possible that when the person 4 perceives the motor vehicle 2 while the motor vehicle 2 is driving past, in particular also perceives the externally recognizable and perceivable identifier 8, the person 4 recognizes that this motor vehicle 2 detects surroundings information.

The person 4 can now initiate contact with the electronic evaluation unit 3 on the basis of this knowledge. For example, in this context, this perceivable identifier 8, if it was noticed by the person 4 himself, for example, can be input into an electronic unit, in particular the communication device 6, and contact with the electronic evaluation unit 3 can thus be established. The identifier 8 can be, for example, an internet link or a software application link or a QR code. The identifier 8 can also be an alphanumeric value or an alphanumeric ID identifier. When inputting this identifier 8 into the communication device 6, a communication with the electronic evaluation unit 3 is then established to the effect that further courses of action can be displayed and offered to the person as the primary information then obtained. This can, for example, be information about how the person 4 can proceed in order to find out whether personal information relating to the person 4 was also detected during the detection of the surroundings information. By way of a non-limiting example, a verification request or an information request can be offered electronically as a possible course of action, with which the person 4 can verify whether personal information was detected when the motor vehicle 2 was driving past. Further, an anonymization request can also be offered. With this, the person 4 can request that personal information be anonymized. In addition to or instead of this, a deletion request can also be offered, with which the person 4 can delete detected personal information. In particular, it is then also possible in this context for the optical identifier 8 to be optically detected by the detection unit 7 of the communication device 6 and for communication with the electronic evaluation unit 3 to be carried out on the basis of this detection.

It can be provided that according to this first step, in which the person 4 comes into primary contact with the electronic evaluation unit 3 via the communication device 6, this still has to be done in a person-identified manner. If, however, in further communication with the electronic evaluation unit 3, a verification request and/or an anonymization request, and/or a deletion request is made by the person 4, it is necessary that the person 4 identifies himself unambiguously in this regard as well. For example, this can be done using specific identification information that is personal. This can be done using personal data such as name, address, number of an identity card, or the like. In addition to or instead of this, this can be done with other image identification information. For example, the identifying body features can be, for example, one or more images of the face of the person 4. These can then be recorded by the person 4 and sent to the electronic evaluation unit 3, for example, via the communication device 6. This allows, on the one hand, an unambiguous identification for the following steps mentioned above, in particular the course of action offered. On the other hand, a faster and more precise analysis of the surroundings information with regard to personal information about the person 4 can then also be made possible in this context. This allows a faster and more precise search for personal information of the person 4 in the detected surroundings information.

It can also be provided that the person 4 transmits person-specific location information from the person 4 himself with the communication device 6 to the electronic evaluation unit 3. This personal location information is compared by the electronic evaluation unit 3 with motor vehicle location information that was detected during the trip of the motor vehicle 2 along the trajectory 11, in particular continuously. Such location information can be a location and a point in time at which the motor vehicle 2 is at a specific location. The same can also be done for the person 4, who then specifies a location at which he was at a specific point in time. This location information relating to the motor vehicle 2 is automatically and continuously generated and stored while driving. With regard to the person 4, this can be done, for example, using a communication device 6 that is carried along. This communication device 6 can be used to determine at what point in time this communication device 6 was at which location. If this can be determined automatically, the electronic information processing system 1 can automatically verify whether the person 4 was at the same location or in the immediate surroundings range of the motor vehicle 2 at a specific point in time, for example in FIG. 2 at the point in time t+2. If this is the case, an electronic message can automatically be transmitted from the evaluation unit 3 to the communication device 6 in a first step. This can be a first primary informational message. In particular, a message can be transmitted in this context which allows the person 4 to be made aware of a possible detection. The person 4 can then decide whether to continue the communication with the electronic evaluation unit 3 in order to obtain further information if necessary, in particular to obtain information about it and to request whether personal information has been detected.

However, it can also be provided that during this mentioned comparison of the location information, the electronic evaluation unit 3 already determines that personal information has been detected and the message to the person 4 who is carrying this communication device 6 already contains the information that personal information was detected. In this context, the person 4 can then establish communication with the electronic evaluation unit 3 in a further step and then submit an anonymization request and/or a deletion request in this context.

It is also possible for the electronic message to be transmitted from the electronic evaluation unit 3 to the communication device 6 only when the person 4 initiates this beforehand. This can be done, for example, by the person 4 explicitly inputting the location and the point in time into the communication device 6, this information then being transmitted to the electronic evaluation unit 3 initiated by the person 4. In this person-initiating transmission of this location information to the electronic evaluation unit 3, this comparison of the location information is then only carried out in the electronic evaluation unit 3 on the basis of this triggering event.

It can also be provided that communication between the person 4, in particular the communication device 6, and the electronic evaluation unit 3 is carried out both on the basis of the perceived identifier 8 and on the basis of the location information.

In particular, it is also possible in the above-mentioned embodiments/aspects that the perceivable identifier can be changed dynamically. The change is defined in the context that a specific identifier appearance of identifier 8 is displayed at specific points in time. It is therefore known for each point in time which identifier appearance the identifier 8 then had. This allows an unambiguous assignment as to whether, at a specific point in time, the person 4 was at a location where the motor vehicle 2 was also located. Only in this case, the person 4 can have perceived the specific identifier appearance of the identifier 8 at this point in time and use it for communication with the electronic evaluation unit 3.

The invention claimed is:

1. A method for electronically processing surroundings information of a motor vehicle, wherein personal information included in the surroundings information is anonymized or deleted based on whether a person to whom the personal information relates has made an electronic request, the method comprising:
    detecting, by a detection unit of the motor vehicle, the surroundings information of the motor vehicle, wherein the personal information of the person is included in the surroundings information;
    exhibiting, by the motor vehicle, a perceivable identifier of the motor vehicle;
    dynamically changing the perceivable identifier of the motor vehicle upon moving of the motor vehicle;
    receiving, at an evaluation unit, via a communication unit of the person, a communication from the person, the communication including personal location information, the personal location information comprising a first location and a first point in time of the person, the communication further including the perceivable identifier observed by the person at the first location and the first point in time;
    based on the communication including the perceivable identifier, determining that the person was located at the first location at the first point in time;
    comparing, by the evaluation unit, the personal location information with motor vehicle location information corresponding to the first point in time in the personal location information;
    upon matching of the personal location information and the motor vehicle location information based on the comparing, notifying the person via an electronic message by the evaluation unit about personal information detected in the surroundings information; and
    in response to the matching, determining, by the evaluation unit, an action available to the person upon recognizing the personal information of the person in the surroundings information related to the surroundings of the motor vehicle;
    generating the perceivable identifier as an optical identifier; and
    providing the generated perceivable identifier as an internet link, a software application link, or a Quick Response (QR) code, wherein the QR code appears on an outside of the motor vehicle.

2. The method of claim 1, further comprising notifying the person of the action available to the person upon recognizing the personal information of the person in the surroundings information.

3. The method of claim 2, wherein the action available to the person comprises:
    an ability to verify whether the personal information has been detected using a verification request,
    an ability to anonymize the detected personal information using an anonymization request, or
    an ability to delete the detected personal information using a deletion request.

4. The method of claim 1, wherein at least one piece of the personal information is electronically transmitted and provided by the person to the evaluation unit, the method further comprising:
    training a recognition process for recognizing the person using personal identification information;
    examining the surroundings information using the trained recognition process for detecting the person in the surroundings information; and
    transmitting a result of the examining the surroundings information in an electronic message to the person.

5. The method of claim 1, further comprising detecting the surroundings information from training information recorded by the detection unit during a training drive of the motor vehicle, wherein an accuracy of the training information is evaluated after the training drive.

6. The method of claim 1, wherein the detection unit comprises a camera.

7. A computer program product, comprising instructions which, when executed by a computer, cause the computer to perform operations comprising:
    detecting, by a detection unit of a motor vehicle, surroundings information of the motor vehicle, wherein personal information of a person is included in the surroundings information, the person being in a vicinity of the motor vehicle;
    exhibiting, by the motor vehicle, a perceivable identifier of the motor vehicle;
    dynamically changing the perceivable identifier of the motor vehicle upon moving of the motor vehicle;
    receiving, at an evaluation unit, via a communication unit of the person, a communication from the person, the communication including personal location information, the personal location information comprising a first location and a first point in time of the person, the communication further including the perceivable identifier observed by the person at the first location and the first point in time;
    based on the communication including the perceivable identifier, determining that a person was located at the first location at the first point in time;
    comparing, by the evaluation unit, the personal location information with motor vehicle location information corresponding to the first point in time in the personal location information;
    upon matching of the personal location information and the motor vehicle location information based on the comparing, notifying the person via an electronic message by the evaluation unit about personal information detected in the surroundings information;
    in response to the matching, determining, by the evaluation unit, an action available to the person upon recognizing the personal information of the person in the surroundings information related to the surroundings of the motor vehicle; and anonymizing or deleting the personal information included in the surroundings information based on whether the person to whom the personal information relates has made an electronic request;

generating the perceivable identifier as an optical identifier; and providing the generated perceivable identifier as an internet link, a software application link, or a Quick Response (QR) code, wherein the QR code appears on an outside of the motor vehicle.

8. The computer program product of claim 7, wherein the action available to the person comprises:

an ability to verify whether the personal information has been detected using a verification request, an ability to anonymize the detected personal information using an anonymization request, or an ability to delete the detected personal information using a deletion request.

9. An electronic information processing system, comprising a motor vehicle and an evaluation unit, wherein the electronic information processing system is configured to perform operations comprising:

detecting, by a detection unit of the motor vehicle, surroundings information of the motor vehicle, wherein personal information of the person is included in the surroundings information, the person being in a vicinity of the motor vehicle;

exhibiting, by the motor vehicle, a perceivable identifier of the motor vehicle;

dynamically changing the perceivable identifier of the motor vehicle upon moving of the motor vehicle;

receiving, at the evaluation unit, via a communication unit of the person, a communication from the person, the communication including personal location information, the personal location information comprising a first location and a first point in time of the person, the communication further including the perceivable identifier observed by the person at the first location and the first point in time;

based on the communication including the perceivable identifier, determining that a person was located at the first location at the first point in time;

comparing, by the evaluation unit, the personal location information with motor vehicle location information corresponding to the first point in time in the personal location information;

upon matching of the personal location information and the motor vehicle location information based on the comparing, notifying the person via an electronic message by the evaluation unit about personal information detected in the surroundings information;

in response to the matching, determining, by the evaluation unit, an action available to the person upon recognizing the personal information of the person in the surroundings information related to the surroundings of the motor vehicle; and anonymizing or deleting the personal information included in the surroundings information based on whether the person to whom the personal information relates has made an electronic request;

generating the perceivable identifier as an optical identifier; and providing the generated perceivable identifier as an internet link, a software application link, or a Quick Response (QR) code, wherein the QR code appears on an outside of the motor vehicle.

10. The electronic information processing system of claim 9, wherein the perceivable identifier is configured to be an acoustic identifier.

11. The electronic information processing system of claim 9, wherein the perceivable identifier is configured to be an optical identifier and/or an electronic identifier.

12. The electronic information processing system of claim 9, wherein the detection unit comprises a lidar system.

* * * * *